US012776956B2

(12) United States Patent
Patronas et al.

(10) Patent No.: US 12,776,956 B2
(45) Date of Patent: Oct. 27, 2026

(54) SYSTEM FOR OPTIMIZED DATA COMMUNICATION IN HIERARCHICAL NETWORKS

(71) Applicant: MELLANOX TECHNOLOGIES, LTD., Yokneam (IL)

(72) Inventors: Ioannis (Giannis) Patronas, Piraeus (GR); Zsolt-Alon Wertheimer, Kiryat Ata (IL); Nikolaos Terzenidis, Kilkis (GR); Dimitrios Syrivelis, Volos (GR); Eitan Zahavi, Zichron Yaakov (IL); Paraskevas Bakopoulos, Ilion (GR); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/427,269

(22) Filed: Jan. 30, 2024

(65) Prior Publication Data

US 2025/0247299 A1 Jul. 31, 2025

(30) Foreign Application Priority Data

Jan. 25, 2024 (GR) .............................. 20240100053

(51) Int. Cl.
*H04L 41/12* (2022.01)
*H04L 45/02* (2022.01)
*H04L 49/25* (2022.01)

(52) U.S. Cl.
CPC .............. *H04L 41/12* (2013.01); *H04L 45/04* (2013.01); *H04L 49/25* (2013.01)

(58) Field of Classification Search
CPC ......... H04L 67/10; H04L 45/04; H04L 45/46; H04L 41/16; H04L 41/0816;
(Continued)

(56) References Cited

U.S. PATENT DOCUMENTS 9,154,457 B1 * 10/2015 Li ............................ H04L 49/65
9,210,048 B1 * 12/2015 Marr ..................... H04L 41/145
(Continued)

FOREIGN PATENT DOCUMENTS

WO WO-2017132271 A1 * 8/2017 ......... H04L 41/0853

OTHER PUBLICATIONS

Urman et al., Pending U.S. Appl. No. 18/242,637, filed Sep. 6, 2023.
(Continued)

*Primary Examiner* — Tonia L Dollinger
*Assistant Examiner* — Linh T. Nguyen
(74) *Attorney, Agent, or Firm* — Alston & Bird LLP

(57) ABSTRACT

Systems, computer program products, and methods are described for data communication. In an example, a data distribution task with execution parameters that include plurality of data portions and plurality of hosts is received from a user input device. A plurality of points of delivery (PODs) are determined, wherein the plurality of PODs comprises a plurality of switches, and the plurality of PODs are operatively coupled to the plurality of hosts to configure a network structure. At least one destination host is identified for each source host based on at least a number of communication hops required for traversal of data from each source host to the at least one destination host via a corresponding subset of the plurality of switches, and the data distribution task is executed by transmitting respective portions of the plurality of data portions from each source host to the at least one identified destination.

27 Claims, 4 Drawing Sheets

(58) Field of Classification Search
CPC ............. H04L 41/5012; H04L 41/5019; H04L 41/505; H04L 45/44; H04L 49/35; H04L 49/252; H04L 49/25; H04L 41/12; G06N 5/04
See application file for complete search history.

(56) References Cited

U.S. PATENT DOCUMENTS

| | | | | |
|---|---|---|---|---|
| 9,632,827 | B2 * | 4/2017 | Ahmed | G06F 9/5027 |
| 9,705,798 | B1 * | 7/2017 | Abts | H04L 47/122 |
| 10,218,538 | B1 * | 2/2019 | Klausler | H04L 49/1569 |
| 11,350,189 | B2 | 5/2022 | Bakopoulos et al. | |
| 2003/0081548 | A1 * | 5/2003 | Langevin | H04L 49/254 370/235 |
| 2009/0147760 | A1 * | 6/2009 | Lee | H04W 40/10 370/338 |
| 2011/0289230 | A1 * | 11/2011 | Ueno | H04L 69/161 709/228 |
| 2012/0250574 | A1 * | 10/2012 | Marr | H04L 41/12 370/254 |
| 2013/0258856 | A1 * | 10/2013 | Chrysos | H04L 49/1507 370/236 |
| 2013/0290418 | A1 * | 10/2013 | Liu | H04L 12/1854 709/219 |
| 2013/0329622 | A1 * | 12/2013 | Takeda | H04L 5/0053 370/312 |
| 2015/0006749 | A1 * | 1/2015 | Hendel | H04L 47/34 709/230 |
| 2015/0249590 | A1 * | 9/2015 | Gusat | H04L 45/48 370/392 |
| 2015/0334035 | A1 * | 11/2015 | Miwa | H04L 65/611 370/390 |
| 2016/0087915 | A1 * | 3/2016 | Marr | H04L 49/20 709/226 |
| 2017/0070447 | A1 * | 3/2017 | Marr | H04L 41/145 |
| 2020/0045131 | A1 | 2/2020 | Nigam et al. | |
| 2021/0127366 | A1 * | 4/2021 | Liang | H04W 72/53 |
| 2021/0168063 | A1 * | 6/2021 | D'Antoni | H04L 45/28 |
| 2023/0198896 | A1 * | 6/2023 | Zhou | H04L 45/42 370/392 |

OTHER PUBLICATIONS

Patronas et al., Pending U.S. Appl. No. 18/416,028, filed Jan. 18, 2024.

Patronas et al., Pending U.S. Appl. No. 18/415,878, filed Jan. 18, 2024.

Patronas et al., Pending U.S. Appl. No. 18/427,046, filed Jan. 30, 2024.

Bogdan Prisacari, et al: "Generalized Hierarchical All-to-All Exchange Patterns", 2013 IEEE 27th International Symposium on Parallel & Distributed Processing, IEEE, May 20, 2013, pp. 537-547.

* cited by examiner

300

POD, P1

| S.H | S.H | S.H | S.H | STAGE | D.H for S.H1 | D.H for S.H2 | D.H for S.H3 | D.H for S.H4 |
|---|---|---|---|---|---|---|---|---|
| H0 | H1 | H2 | H3 | 0 | H0 | H1 | H2 | H3 |
| H0 | H1 | H2 | H3 | 1 | H1 | H0 | H3 | H2 |
| H0 | H1 | H2 | H3 | 2 | H2 | H3 | H0 | H1 |
| H0 | H1 | H2 | H3 | 3 | H3 | H2 | H1 | H0 |
| H0 | H1 | H2 | H3 | 4 | H4 | H5 | H6 | H7 |
| H0 | H1 | H2 | H3 | 5 | H5 | H4 | H7 | H6 |
| H0 | H1 | H2 | H3 | 6 | H6 | H7 | H4 | H5 |
| H0 | H1 | H2 | H3 | 7 | H7 | H6 | H5 | H4 |
| H0 | H1 | H2 | H3 | 8 | H8 | H9 | H10 | H11 |
| H0 | H1 | H2 | H3 | 9 | H9 | H8 | H11 | H10 |
| H0 | H1 | H2 | H3 | 10 | H10 | H11 | H8 | H9 |
| H0 | H1 | H2 | H3 | 11 | H11 | H10 | H9 | H8 |
| H0 | H1 | H2 | H3 | 12 | H12 | H13 | H14 | H15 |
| H0 | H1 | H2 | H3 | 13 | H13 | H12 | H15 | H14 |
| H0 | H1 | H2 | H3 | 14 | H14 | H15 | H12 | H13 |
| H0 | H1 | H2 | H3 | 15 | H15 | H14 | H13 | H12 |

402 404 406

FIG. 4

SYSTEM FOR OPTIMIZED DATA COMMUNICATION IN HIERARCHICAL NETWORKS

CROSS-REFERENCE TO RELATED APPLICATIONS

This application claims priority to Greek Patent Application No. 20240100053, filed Jan. 25, 2024, the entire contents of which application are hereby incorporated herein by reference.

TECHNOLOGICAL FIELD

Example embodiments of the present invention relate to network communications and, more particularly, to facilitate optimized data communication.

BACKGROUND

In network environments that necessitate comprehensive interconnectivity, the need for efficient and dynamic data exchange continues to rise, driven primarily by applications that demand rapid information transfer. In traditional networks, typically based on hierarchical designs with multiple switching layers, the objective is to ensure robust communication between every host. However, for example, as data communication extends to more distant hosts within the network structure, the communication path becomes more complex, leading to uneven routing and potential inefficiencies.

Applicant has identified a number of deficiencies and problems associated with conventional network systems and associated communications. Many of these identified problems have been solved by developing solutions that are included in embodiments of the present disclosure, many examples of which are described in detail herein.

BRIEF SUMMARY

Systems, methods, and computer program products are therefore provided for allocation of network resources for executing computationally intensive machine learning tasks in a dynamic, structured hierarchical network.

In one aspect, a method for data communication in hierarchical networks is presented. The method comprising: receiving, from a user input device, a data distribution task and parameters associated with the data distribution task, wherein the parameters comprise a plurality of data portions and a plurality of hosts; determining a plurality of points of delivery (PODs) based on the plurality of hosts, wherein the plurality of PODs is associated with a plurality of switches, wherein each switch is associated with a radix (k); operatively coupling the plurality of switches to the plurality of hosts to configure a network structure; identify, from the plurality of hosts, at least one destination host for each source host based on at least a number of communication hops, wherein the number of communication hops is determined based on a corresponding subset of the plurality of switches associated with traversal of data from each source host to the at least one destination; and executing the data distribution task by transmitting respective portions of the plurality of data portions from each source host to the at least one identified destination host via the corresponding subset of the plurality of switches.

In some embodiments, executing the data distribution task comprises transmitting the plurality of data portions according to an all-to-all communication pattern.

In some embodiments, executing the data distribution task comprises: determining a required number of data distribution stages for execution of the data distribution task based on at least an aggregate count of the plurality of hosts; and transmitting the plurality of data portions in a sequence of data distribution stages based on the required number of data distribution stages.

In some embodiments, for each data distribution stage(s), the method comprises: identifying the at least one destination host (j) for each source host (i) such that the number of data communication hops required for traversal of data from each source host (i) to the at least one identified destination host (j) via the corresponding subset of the plurality of switches is equal; and transmitting a predetermined data portion from the source host (i) to the at least one identified destination host (j) via the corresponding subset of the plurality of switches.

In some embodiments, the at least one destination host is identified based on:

$$j = \left(i + s \bmod \frac{k}{2}\right) + \left(\left(\frac{k}{2} * \left\lfloor \frac{i}{\frac{k}{2}} \right\rfloor + \frac{k}{2} * \left\lfloor \frac{s}{\frac{k}{2}} \right\rfloor\right) \bmod \frac{k^2}{4}\right) + \left(\left(\frac{k^2}{4} * \left\lfloor \frac{i}{\frac{k^2}{4}} \right\rfloor + \frac{k^2}{4} * \left\lfloor \frac{s}{\frac{k^2}{4}} \right\rfloor\right) \bmod \frac{k^3}{4}\right)$$

In some embodiments, wherein $$\left(i + s \bmod \frac{k}{2}\right)$$

defines a cyclic sequence of communication between the plurality of hosts under each switch.

In some embodiments, $$\left(\left(\frac{k}{2} * \left\lfloor \frac{i}{\frac{k}{2}} \right\rfloor + \frac{k}{2} * \left\lfloor \frac{s}{\frac{k}{2}} \right\rfloor\right) \bmod \frac{k^2}{4}\right)$$

identifies a destination switch within a destination POD associated with the at least one identified destination host (j) by determining a switch offset defining a relative position of the destination switch within the destination POD.

In some embodiments, $$\left(\left(\frac{k^2}{4} * \left\lfloor \frac{i}{\frac{k^2}{4}} \right\rfloor + \frac{k^2}{4} * \left\lfloor \frac{s}{\frac{k^2}{4}} \right\rfloor\right) \bmod \frac{k^3}{4}\right)$$

identifies a destination POD associated with the at least one identified destination host (j) by determining a POD offset defining a relative position of the at least one identified destination host (j) within the plurality of PODs.

In some embodiments, for each data distribution stage(s), a number of destination hosts for each source host (i) is determined based on a window size W.

In some embodiments, the number of destination hosts for each source host (i) is equal to the window size W.

In some embodiments, for window size W>1, executing the data distribution task comprises executing the data distribution task in a clustered grouping of data distribution stages, wherein a size of the clustered grouping is based on at least the number of communication hops required for traversal of data from each source host to the at least one identified destination host via the corresponding subset of the plurality of switches.

In some embodiments, executing the data distribution task in the sequence of data distribution stages further comprises: iteratively determining the at least one identified destination host (j) for each source host (i) at each data distribution stage(s) for the required number of data distribution stages; and at each iteration, transmitting data portions from the plurality of data portions from the source host (i) to the at least one identified destination host (j).

In some embodiments, the method comprises: determining that an allocation of the subset of the plurality of hosts under each POD is asymmetric; integrating a plurality of virtual hosts in the network structure to balance the asymmetric distribution of the subset of the plurality of hosts under each POD; and executing the data distribution task by transmitting respective portions of the plurality of data portions from each source host to the at least one identified destination host via the corresponding subset of the plurality of PODs, wherein the at least one identified destination host comprises at least one of the plurality of hosts and the plurality of virtual hosts.

In some embodiments, transmitting further comprises transmitting no data to the plurality of virtual hosts.

In some embodiments, the plurality of switches comprises at least one of a plurality of electrical switches or a plurality of optical switches, wherein the plurality of electrical switches comprises at least a plurality of leaf switches, a plurality of spine switches, or a plurality of core switches.

In yet another aspect, a system for data communication in hierarchical networks is presented. The system comprising: a processing device; and a non-transitory storage device containing instructions that, when executed by the processing device, cause the processing device to: receive, from a user input device, a data distribution task and parameters associated with the data distribution task, wherein the parameters comprise a plurality of data portions and a plurality of hosts; determine a plurality of points of delivery (PODs) based on the plurality of hosts, wherein the plurality of PODs is associated with a plurality of switches, wherein each switch is associated with a radix (k); operatively couple the plurality of switches to the plurality of hosts to configure a network structure; identify, from the plurality of hosts, at least one destination host for each source host based on at least a number of communication hops, wherein the number of communication hops is determined based on a corresponding subset of the plurality of switches associated with traversal of data from each source host to the at least one destination; and execute the data distribution task by transmitting respective portions of the plurality of data portions from each source host to the at least one identified destination host via the corresponding subset of the plurality of switches.

In yet another aspect, a computer program product for data communication is presented. The computer program product comprising a non-transitory computer-readable medium comprising code configured to cause an apparatus to: receive, from a user input device, a data distribution task and parameters associated with the data distribution task, wherein the parameters comprise a plurality of data portions and a plurality of hosts; determine a plurality of points of delivery (PODs) based on the plurality of hosts, wherein the plurality of PODs is associated with a plurality of switches, wherein each switch is associated with a radix (k); operatively couple the plurality of switches to the plurality of hosts to configure a network structure; identify, from the plurality of hosts, at least one destination host for each source host based on at least a number of communication hops, wherein the number of communication hops is determined based on a corresponding subset of the plurality of switches associated with traversal of data from each source host to the at least one destination; and execute the data distribution task by transmitting respective portions of the plurality of data portions from each source host to the at least one identified destination host via the corresponding subset of the plurality of switches.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 4 illustrates an example equation outcome table for optimized data communication associated with POD P1 of FIG. 1, in accordance with an embodiment of the invention.

DETAILED DESCRIPTION

Overview

Figure 1:
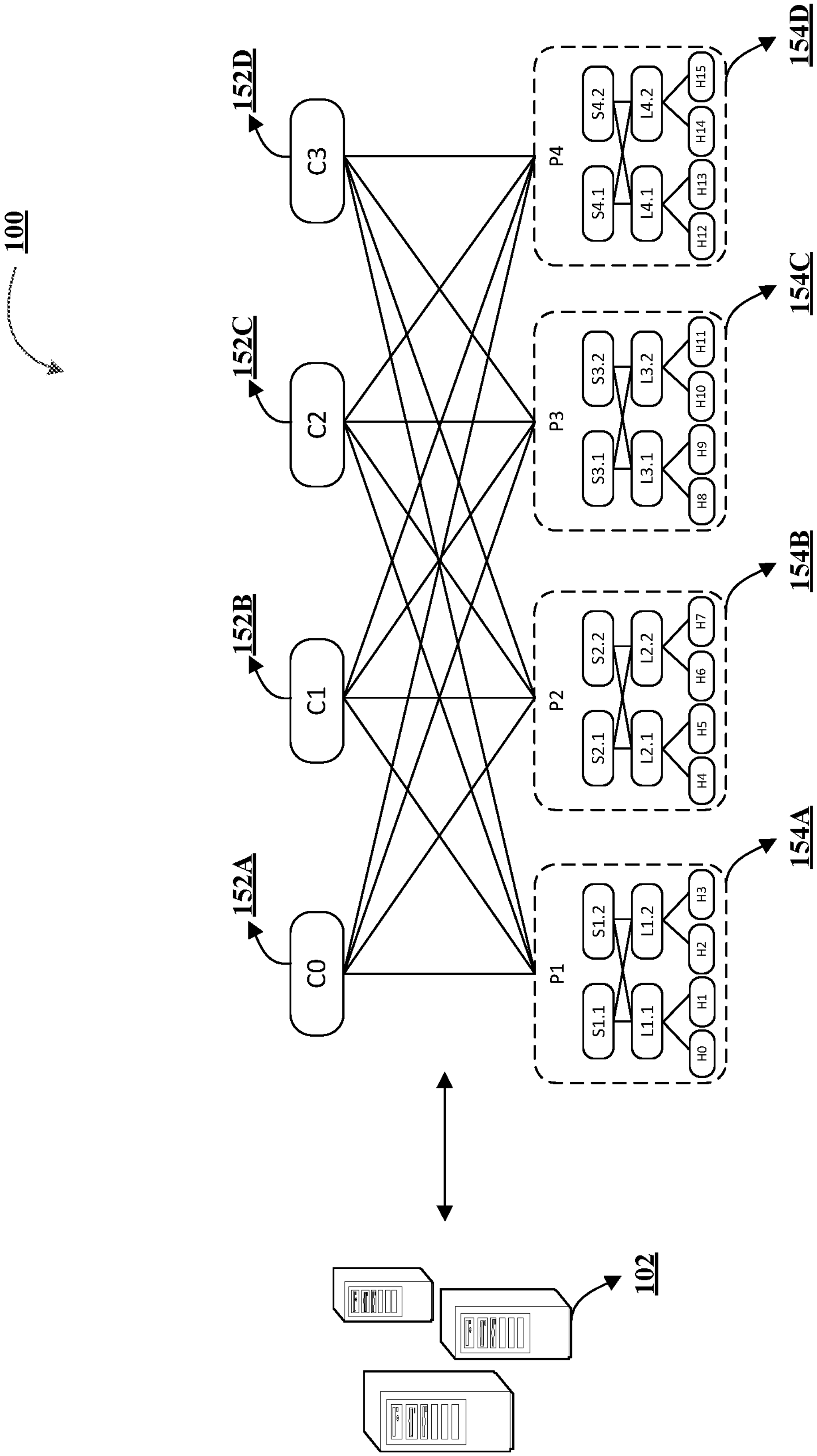
FIG. 1 illustrates an example network environment for optimized data communication, in accordance with an embodiment of the present invention.

In network environments that necessitate comprehensive interconnectivity, the need for efficient and dynamic data exchange continues to rise, driven primarily by applications that demand rapid information transfer. In traditional networks, typically based on hierarchical designs with multiple switching layers, the objective is to ensure robust communication between every host. However, for example, as data communication extends to more distant hosts within the network structure, the communication path becomes more complex, leading to uneven routing and potential inefficiencies.

In a traditional hierarchical network, hosts (or servers) have ports that provide the primary interface for the servers to connect with the network. Every port from a host is coupled to a port on a switch (e.g., leaf switch), serving as the first layer of network distribution. In some configurations, these switches can further connect to a secondary layer of switches (e.g., spine switches), which act as a secondary layer of aggregation and distribution. These switches may further interface with core switches, which form the topmost layer in the network hierarchy, facilitating connectivity and data routing between different leaf and spine switch clusters for optimal network traffic management and scalability.

Each host, Hi, may be equipped with ports that allow the host to be connected to a point of delivery (POD), Px. A POD may refer to a basic unit of network segment made up of a combination of switches, and in some cases, other network components, that together provide network services to the hosts. For instance, a POD may include leaf switches, Lx, that are operatively coupled to the hosts and spine switches, Sy, that are operatively coupled to the leaf switches, Lx. In some cases, each POD may be fully connected, whereby all the leaf switches, Lx within the POD are interconnected through the spine switches, Sy. The hosts may be evenly and symmetrically distributed across the available PODs. For example, consider the network structure in FIG. 1, involving 16 hosts and 4 PODs, in which a POD includes both leaf switches, Lx, and spine switches, Sy that are fully connected. In this arrangement, the hosts are distributed evenly across the 4 PODs, with each POD having 4 hosts and each leaf switch in each POD being connected to 2 distinct hosts. As such, H0, H1, H2, and H3 may be operatively coupled to P1, where H0 and H1 are operatively coupled to L1.1 and H2 and H3 are operatively coupled to L1.2; H4, H5, H6, and H7 may be operatively coupled to P2, where H4 and H5 may be operatively coupled to L2.1 and H6 and H7 may be operatively coupled to L2.2; and so on.

To execute an all-to-all communication pattern in the given network structure, every host in the network should communicate with every other host. To achieve this in a systematic and efficient manner, the data communication process is divided into stages. At each stage, the data communication between hosts is directed using a window of size, W. For a window size, W=1, at each stage a particular source host may communicate with exactly one destination host. Data communication at each stage is traditionally governed by j=(i+s) mod N. Here, i is the source host, j is the destination host, s is the stage, and N is the total number of hosts. In the example described herein, the total number of hosts N is equal to 16. According to the given equation, at Stage 0, hosts primarily exchange data within themselves. Moving to Stage 1, each host forwards data to the next host in line. This stage brings forth inter-switch communications, such as when H2 under L1.1 transmits data to H3 under L1.2. Stage 1 also bring forth inter-POD communications, such as H3 under L1.2 in P1 transmitting data to H4 under L2.1 in P2. Here, the number of communication hops required for inter-switch communication and the number of communication hops required for inter-POD communication are unequal. As we progress through the stages, the distance between communicating hosts becomes greater, and the path that the data communication must travel through the network hierarchy becomes more convoluted, as the number of hops required for each communication increases.

Embodiments of the invention address these challenges to optimize data transmission through the network. Accordingly, embodiments of the invention propose optimizing the data transmission to implement an all-to-all communication pattern when executing tasks using the network structure to ensure that at each stage, data communication from each source host to a corresponding destination host has an equal number of communication hops. Instead of using the traditional all-to-all communication pattern equation for data communication, embodiments of the invention introduce the following equation to govern the data communication at each stage:

$$j=\left(i+s\bmod\frac{k}{2}\right)+\left(\left(\frac{k}{2}*\left\lfloor\frac{i}{\frac{k}{2}}\right\rfloor+\frac{k}{2}*\left\lfloor\frac{s}{\frac{k}{2}}\right\rfloor\right)\bmod\frac{k^2}{4}\right)+\left(\left(\frac{k^2}{4}*\left\lfloor\frac{i}{\frac{k^2}{4}}\right\rfloor+\frac{k^2}{4}*\left\lfloor\frac{s}{\frac{k^2}{4}}\right\rfloor\right)\bmod\frac{k^3}{4}\right)$$

Here, k is the radix of the switches. To maintain equal number of communication hops between all host communications, at each stage, for every source host, i, the three parts of the equation are executed and subsequently aggregated to calculate the destination host j. The first part of the equation, $$\left(i+s\bmod\frac{k}{2}\right),$$

may define a cyclic sequence of communication between the plurality of hosts, ensuring that each host communicates with every other host. The second part of the equation, $$\left(\left(\frac{k}{2}*\left\lfloor\frac{i}{\frac{k}{2}}\right\rfloor+\frac{k}{2}*\left\lfloor\frac{s}{\frac{k}{2}}\right\rfloor\right)\bmod\frac{k^2}{4}\right),$$

may define a destination switch within a particular destination POD associated with the destination host. In other words, the second part of the equation may identify which switch within a given POD should be the destination for a particular communication process. In this regard, the second part of the equation may calculate a value that represents a switch offset, or relative position of the switch within a POD. Such a value may indicate which specific switch inside the POD should handle the data transmission for that communication instance. The third part of the equation, $$\left(\left(\frac{k^2}{4}*\left\lfloor\frac{i}{\frac{k^2}{4}}\right\rfloor+\frac{k^2}{4}*\left\lfloor\frac{s}{\frac{k^2}{4}}\right\rfloor\right)\bmod\frac{k^3}{4}\right),$$

may define a destination POD associated with the destination host. In this regard, the third part of the equation may calculate a value that represents a POD offset, or relative position of a destination host j within the hierarchy of PODs. Such a value may indicate which POD in the network's hierarchy should be the target for the communication. In other words, the third part of the equation may select the appropriate POD for the destination host for each communication stage. At each stage, for every source host, the three parts of the equation are executed and subsequently aggregated to determine the destination host. Such a structured approach assures that the number of hops from a source host to a destination host is consistent for all host interactions. In other words, at each stage, data communication from each source host to its corresponding destination host has an equal number of communication hops. This is accomplished by methodically creating offsets at different layers of the network structure, ensuring balanced load and communication efficiency.

In the example described, at each stage a particular source host may communicate with exactly one destination host. However, there may be instances in which, during a stage, a source host may need to transmit data to two or more distinct destination hosts simultaneously. To manage these multiple destinations, embodiments of the invention may cluster the stages based on the size of the window, W, by applying the same formula used for W=1. For example, if W=2, then two stages can be grouped together for simultaneous data communication from a source host to two distinct destinations. Here, the grouping of the stages is based on the number of communication hops determined for each stage. For example, stages that have the same number of communication hops may be grouped together.

In some embodiments, the hosts may not be symmetrically distributed across the available PODs. To address this imbalance, embodiments of the invention may incorporate the use of virtual or 'dummy' hosts. These dummy hosts may be strategically placed under specific PODs in the network structure to balance out the asymmetry. After this rectification, the data communication process can proceed as detailed above. During data transfer, if a virtual host is designated as a destination host, no actual data will be sent to the virtual host.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically or optically coupled and/or are in electrical or optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "interconnected" may imply that each component is directly or indirectly linked to every other component or switch in the network, allowing for seamless data transfer and communication between all the components.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

It should be understood that the word "exemplary" is used herein to mean "serving as an example, instance, or illustration." Any implementation described herein as "exemplary" is not necessarily to be construed as advantageous over other implementations.

Furthermore, as would be evident to one of ordinary skill in the art in light of the present disclosure, the terms "substantially" and "approximately" indicate that the referenced element or associated description is accurate to within applicable engineering tolerances.

Example Network Environment

FIG. 1 illustrates an example network environment 100 for optimized data communication, in accordance with an embodiment of the present invention. As shown in FIG. 1, the network environment 100 may include a system 102, a plurality of switches 152A, 152B, 152C, 152D, and a plurality of PODs 154A, 154B, 154C, 154D. In example embodiments, each POD (e.g., 154A) may have a fully dedicated communication link to every other POD (e.g., 154B, 154C, or 154D) via corresponding switches (e.g., 152A, 152B, or 152C). It is to be understood that the structure of the network environment and its components, connections and relationships, and their functions are meant to be exemplary, only, and are not meant to limit implementations of the embodiments described and/or claimed in this document.

Figure 2:
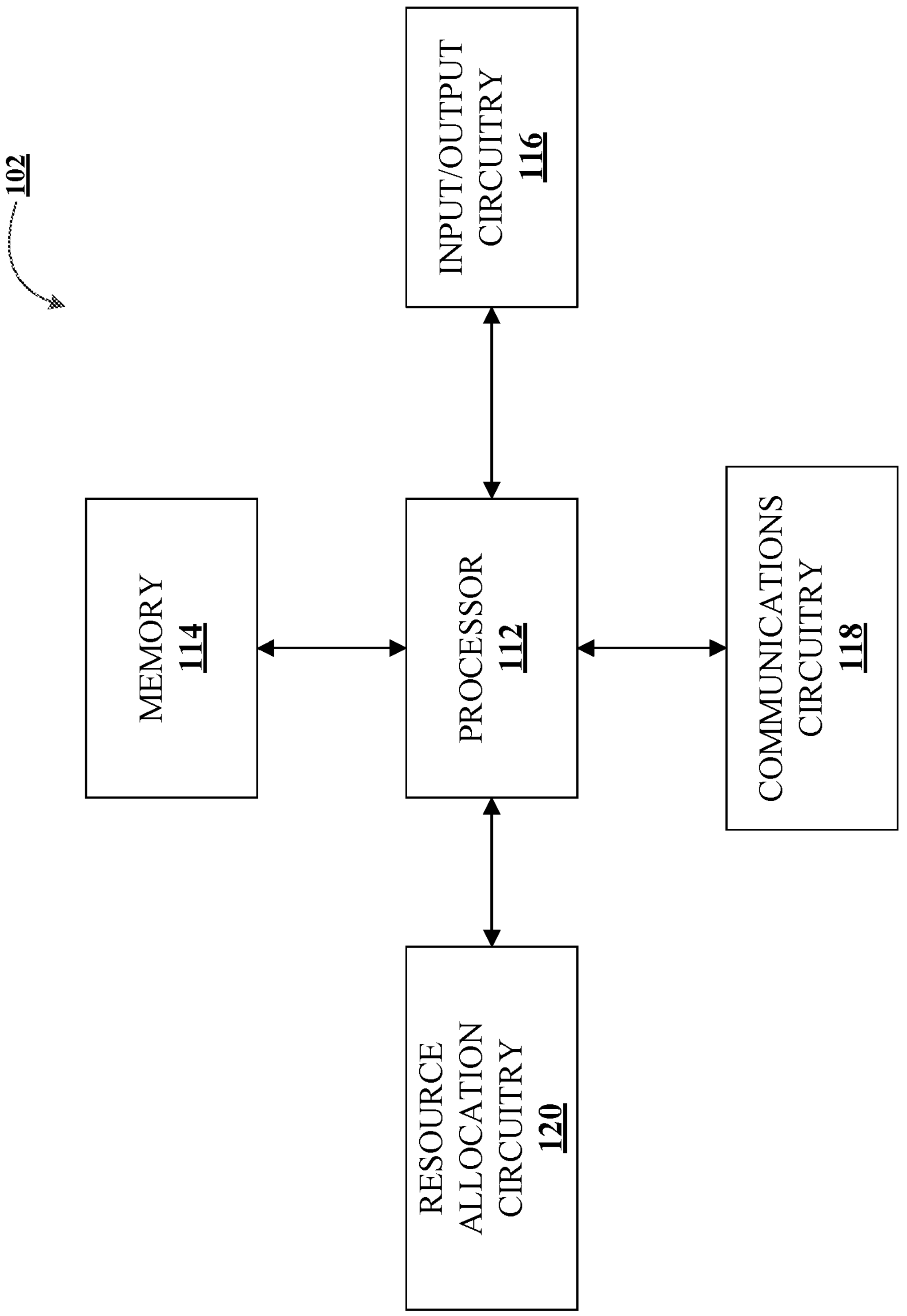
FIG. 2 illustrates an example system circuitry for optimized data communication, in accordance with an embodiment of the present invention.

As shown in FIG. 1, the network environment 100 may include a system 102, described in further detail in FIG. 2. The system 102 may communicate with one or more components (e.g., the plurality of PODs 154A, 154B, 154C, 154D) associated with the network environment 100 to execute embodiments of the invention described herein. The system 102 may be implemented in a number of different forms. For example, the system 102 may be implemented as a standard server, or multiple times in a group of such servers. Additionally, the system 102 may also be implemented as part of a rack server system or a personal computer such as a laptop computer. Alternatively, components from the system 102 may be combined with one or more other same or similar systems, and an entire system 102 may be made up of multiple computing devices communicating with each other. The system 102 may represent various forms of servers, such as web servers, database servers, file servers, or the like, various forms of digital computing devices, such as laptops, desktops, workstations, or the like, or any other auxiliary network devices, Internet-of-things devices, electronic kiosk devices, mainframes, or the like, or any combination of the aforementioned.

As shown in FIG. 1, each POD in the plurality of PODs 154A, 154B, 154C, 154D may refer to a segment or unit within the network architecture that may consolidate networking resources (e.g., switches) and services for efficient delivery to a group of end-users or devices (e.g., hosts). In specific embodiments, a POD may be a physical part of network architecture or a logical grouping within a virtualized environment. In a physical sense, a POD may include tangible components such as cables, switches, routers, and/or the like. In a virtual sense, a POD may represent the logical grouping of network resources assigned to certain tasks or services. Each POD may be customized according to the specific requirements of the services or applications it supports. For example, a POD designed for high-compute tasks may have a different configuration than one optimized for storage or network-intensive workloads. In example embodiments, a POD may provide essential network services to the connected hosts, such as access control, connectivity, load balancing, and possibly network security functions, thus serving as a central point for service management.

In some embodiments, as shown in FIG. 1, each POD may be represented as a plurality of spine switches fully interconnecting a plurality of leaf switches, and a plurality of hosts that are distributed among the plurality of leaf switches and operatively coupled therewith via ports. For example, in POD P1 154A, leaf switches L1.1, L1.2 may serve as the primary layer of network distribution within P1, acting as an intermediary and interconnecting the hosts H0, H1, H2, and H3. Each leaf switch L1.1, L1.2 may include a plurality of uplink ports. These uplink ports may be configured to operatively couple the leaf switches L1.1, L1.2 to spine switches S1.1, S1.2. Spine switches S1.1, S1.2 may serve as a secondary layer of network distribution within P1, acting as an intermediary and interconnecting the leaf switches L1.1, L1.2. Additionally, each leaf switch L1.1, L1.2 may include a plurality of downlink ports. These downlink ports may be configured to operatively couple the leaf switches L1.1, L1.2 to the hosts H0, H1, H2, and H3. Similarly, leaf switches L2.1, L2.2 and spine switches S2.1, S2.2 may serve as the network distribution layers within P2, interconnecting the hosts H4, H5, H6, and H7; leaf switches L3.1, L3.2 and spine switches S3.1, S3.2 may serve as network distribution layers within P3, interconnecting the hosts H8, H9, H10, H11; and so on. A host may be a single computational unit or a cluster of computational units interconnected via an internal network, functioning collectively as a single entity, and configured to perform computational tasks and facilitate data exchange therewithin. In some embodiments, the communication links between the spine switches S1.1, S1.2, the leaf switches L1.1, L1.2, and the hosts H0, H1, H2, H3 may be achieved via Ethernet cables, employing protocols such as Infiniband, NVLink, Transport Control Protocol (TCP)/Internet Protocol (IP), and/or the like.

As shown in FIG. 1, the plurality of PODs 154A, 154B, 154C, 154D may be interconnected via the plurality of switches 152A, 152B, 152C, 152D. In some embodiments, the plurality of switches 152A, 152B, 152C, 152D may be core switches that serve as the highest hierarchical level in the network architecture, acting as a central aggregation point, facilitating high-capacity data transfer among the plurality of PODs 154A, 154B, 154C, 154D. In some embodiments, the communication links among the plurality of switches 152A, 152B, 152C, 152D may also be achieved via Ethernet cables, employing protocols such as Infiniband, NVLink, Transport Control Protocol (TCP)/Internet Protocol (IP), and/or the like.

In some embodiments, each POD may include a number of hosts allocated thereunder. For the purposes of clarity in the ensuing description, hosts may be labeled sequentially as H0, H1, H2, . . . . $H_n$. Each host, Hi, may be equipped with ports that allow the host to be connected to a POD, Px. In example embodiments, the hosts may be evenly and symmetrically distributed across the available PODs. For instance, if there is a total of 4 PODs (e.g., P1, P2, P3, P4) as shown in FIG. 1, and a total of 16 hosts, each of the 4 PODs will have an equal distribution of hosts, with each POD facilitating connections to 4 distinct hosts. In this example, H0, H1, H2, and H3 may connect to P1; H4, H5, H6, and H7 may connect to P2; H8, H9, H10, and H11 may connect to P3; and H12, H13, H14, and H15 may connect to P4. Subsequently, the plurality of PODs 154A, 154B, 154C, 154D may interface with the plurality of switches 152A, 152B, 152C, 152D to facilitate inter-POD communication. For instance, hosts (e.g., H0) under P1 may communicate with hosts (e.g., H4) under P2 via core switch C0; hosts (e.g., H1) under P1 may communicate with hosts (e.g., H8) under P3 via core switch C1; and so on.

It is to be understood that the structure of a POD and its components, connections and relationships, and functions, are meant to be exemplary only, and are not meant to limit implementations of the embodiments described and/or claimed in this document. In one example, the POD may include more, fewer, or different components. In one example, some or all of the components of the POD may be combined into a single portion, or all of the portions of the POD may be separated into two or more distinct portions.

Example System Circuitry

FIG. 2 illustrates a schematic block diagram of example circuitry, some or all of which may be included in the system 102. As shown in FIG. 2, the system 102 may include a processor 112, a memory 114, input/output circuitry 116, communications circuitry 118, and resource allocation circuitry 120.

Although the term "circuitry" as used herein with respect to components 112-120 is described in some cases using functional language, it should be understood that the particular implementations necessarily include the use of particular hardware configured to perform the functions associated with the respective circuitry as described herein. It should also be understood that certain of these components 112-120 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the system 102 may be housed together, while other components are housed separately (e.g., a controller in communication with the system 102). While the term "circuitry" should be understood broadly to include hardware, in some embodiments, the term "circuitry" may also include software for configuring the hardware. For example, in some embodiments, "circuitry" may include processing circuitry, storage media, network interfaces, input/output devices, and the like. In some embodiments, other elements of the system 102 may provide or supplement the functionality of particular circuitry. For example, the processor 112 may provide processing functionality, the memory 114 may provide storage functionality, the communications circuitry 118 may provide network interface functionality, and the like.

In some embodiments, the processor 112 (and/or co-processor or any other processing circuitry assisting or otherwise associated with the processor) may be in communication with the memory 114 via a bus for passing information among components of, for example, the system 102. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., the system 102, to carry out various functions in accordance with example embodiments of the present disclosure.

Although illustrated in FIG. 2 as a single memory, the memory 114 may comprise a plurality of memory components. The plurality of memory components may be embodied on a single computing device or distributed across a plurality of computing devices. In various embodiments, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the system 102 to carry out various functions in accordance with example embodiments discussed herein. For example, in at least some embodiments, the memory 114 may be configured to buffer data for processing by the processor 112. Additionally, or alternatively, in at least some embodiments, the memory 114 may be configured to store program instructions for execution by the processor 112. The memory 114 may store information in the form of static and/or dynamic information. This stored information may be stored and/or used by the system 102 during the course of performing its functionalities.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The processor 112 may, for example, be embodied as various means including one or more microprocessors with accompanying digital signal processor (s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, the processor 112 may include a plurality of processors. The plurality of processors may be embodied on a single computing device or may be distributed across a plurality of such devices collectively configured to function as the system 102. The plurality of processors may be in operative communication with each other and may be collectively configured to perform one or more functionalities of the system 102 as described herein.

In an example embodiment, the processor 112 may be configured to execute instructions stored in the memory 114 or otherwise accessible to the processor 112. Alternatively, or additionally, the processor 112 may be configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure the processor 112 to perform one or more algorithms and/or operations described herein when the instructions are executed. For example, these instructions, when executed by the processor 112, may cause the system 102 to perform one or more of the functionalities thereof as described herein.

In some embodiments, the system 102 further includes input/output circuitry 116 that may, in turn, be in communication with the processor 112 to provide an audible, visual, mechanical, or other output and/or, in some embodiments, to receive an indication of an input from a user or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. The input/output circuitry 116 may include a user interface and may include a web user interface, a mobile application, a kiosk, or the like.

The processor 112 and/or user interface circuitry comprising the processor 112 may be configured to control one or more functions of a display or one or more user interface elements through computer-program instructions (e.g., software and/or firmware) stored on a memory accessible to the processor 112 (e.g., the memory 114, and/or the like). In some embodiments, aspects of input/output circuitry 116 may be reduced as compared to embodiments where the system 102 may be implemented as an end-user machine or other type of device designed for complex user interactions. In some embodiments (like other components discussed herein), the input/output circuitry 116 may be eliminated from the system 102. The input/output circuitry 116 may be in communication with memory 114, communications circuitry 118, and/or any other component(s), such as via a bus. Although more than one input/output circuitry and/or other component can be included in the system 102, only one is shown in FIG. 2 to avoid overcomplicating the disclosure (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module associated therewith. In this regard, the communications circuitry 118 may include, for example, a network interface for enabling communications with a wired or wireless communication network. For example, in some embodiments, communications circuitry 118 may be configured to receive and/or transmit any data that may be stored by the memory 114 using any protocol that may be used for communications between computing devices. For example, the communications circuitry 118 may include one or more network interface cards, antennae, transmitters, receivers, buses, switches, routers, modems, and supporting hardware and/or software, and/or firmware/software, or any other device suitable for enabling communications via a network. Additionally, or alternatively, in some embodiments, the communications circuitry 118 may include circuitry for interacting with the antenna(s) to cause transmission of signals via the antenna (e) or to handle receipt of signals received via the antenna (e). These signals may be transmitted by the system 102 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component of the system 102, such as via a bus. The communication circuitry 118 of the system 102 may also be configured to receive and transmit information with the various components associated therewith.

The resource allocation circuitry 120, in some embodiments, may be used to facilitate execution of the data distribution task. In this regard, the resource allocation circuitry 120 may receive information such as an aggregate count of hosts and data portions for a data distribution task. Upon receiving this input, the resource allocation circuitry 120 may configure various PODs for the data distribution task. As described herein, to execute an all-to-all communication pattern in the given network structure, every host in the network should communicate with every other host. To achieve this, the data communication process may be divided into stages. At each of these stages, the resource allocation circuitry 120 may identify at least one destination host for each source host such that at each stage, data communication from each source host to a corresponding destination host may have an equal number of communication hops. Once identified, the resource allocation circuitry 120 may execute the data distribution task by transmitting respective data portions from each source host to the identified destination host. This iterative process progresses until every host has communicated respective data portions with every other host in the network.

In some embodiments, the system 102 may include hardware, software, firmware, and/or a combination of such components, configured to support various aspects of resource allocation implementations as described herein. It should be appreciated that in some embodiments, the resource allocation circuitry 120 may perform one or more of such example actions in combination with another circuitry of the system 102, such as the memory 114, processor 112, input/output circuitry 116, and communications circuitry 118. For example, in some embodiments, the resource allocation circuitry 120 utilizes processing circuitry, such as the processor 112 and/or the like, to form a self-contained subsystem to perform one or more of its corresponding operations. In a further example, and in some embodiments, some or all of the functionality of the resource allocation circuitry 120 may be performed by the processor 112. In this regard, some or all of the example processes and algorithms discussed herein can be performed by at least one processor 112 and/or the resource allocation circuitry 120. It should also be appreciated that, in some embodiments, the resource allocation circuitry 120 may include a separate processor, specially configured field programmable gate array (FPGA), or application specific interface circuit (ASIC) to perform its corresponding functions.

Additionally, or alternatively, in some embodiments, the resource allocation circuitry 120 may use the memory 114 to store collected information. For example, in some implementations, the resource allocation circuitry 120 may include hardware, software, firmware, and/or a combination thereof, that interacts with the memory 114 to send, retrieve, update, and/or store data.

Accordingly, non-transitory computer readable storage media can be configured to store firmware, one or more application programs, and/or other software, which include instructions and/or other computer-readable program code portions that can be executed to direct operation of the system 102 to implement various operations, including the examples described herein. As such, a series of computer-readable program code portions may be embodied in one or more computer-program products and can be used, with a device, system 102, database, and/or other programmable apparatus, to produce the machine-implemented processes discussed herein. It is also noted that all or some of the information discussed herein can be based on data that is received, generated and/or maintained by one or more components of the system 102. In some embodiments, one or more external systems (such as a remote cloud computing and/or data storage system) may also be leveraged to provide at least some of the functionality discussed herein.

Example Methods for Allocation of Network Resources

Figure 3:
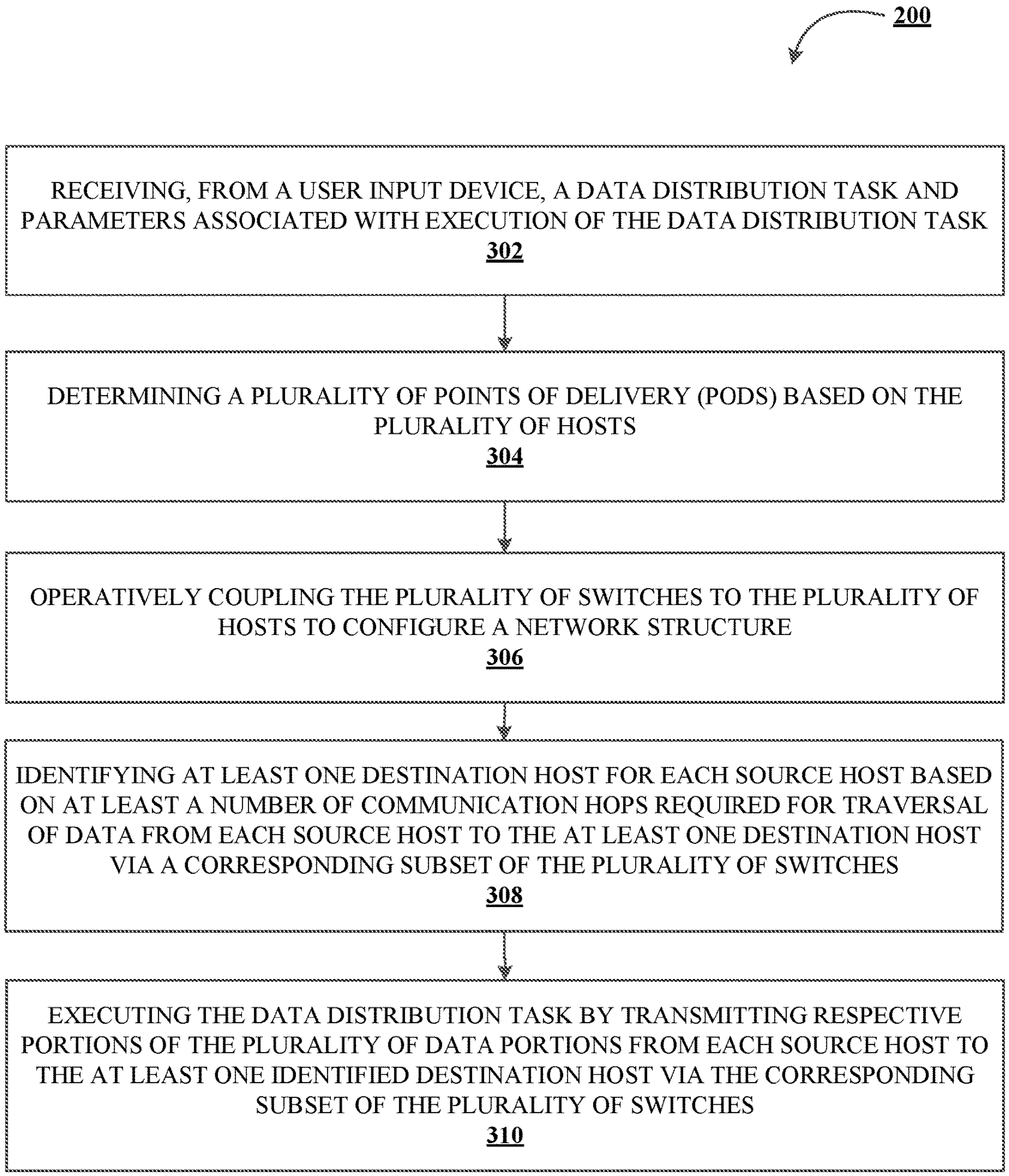
FIG. 3 illustrates an example method for optimized data communication, in accordance with an embodiment of the present disclosure.

FIG. 3 illustrates an example method 300 for optimized data communication, in accordance with an embodiment of the present disclosure. As shown in block 302, the method may include receiving, from a user input device, a data distribution task and parameters associated with execution of the data distribution task. In some embodiments, the parameters associated with the execution of the data distribution task may define the scope and nature of the task. For instance, the parameters of the data distribution task may include a plurality of data portions and a plurality of hosts to which the data portions are to be distributed. These parameters could further specify the size and format of each data portion, the network addresses or identifiers of the hosts, and the intended communication pattern. Additionally, the parameters may include network bandwidth limits, latency requirements, prioritization of data transfers, and any specific routing protocols or algorithms to be employed.

A communication pattern, in the context of distributed computing and parallel processing, may refer to a set of communication operations that involve a group of processes or nodes (e.g., hosts) within a network. Communication patterns apply when managing the data flow between different nodes involved in a computation, especially in environments such as high-performance computing clusters, grid computing, and various forms of parallel processing systems. As such, communication patterns may be involved in data distribution tasks where data is to be distributed across or aggregated from multiple nodes. Examples of communication patterns may include all-to-all, broadcast, scatter-gather, reduction operations, and/or the like.

As shown in block 304, the method may include determining a plurality of points of delivery (PODs) based on the plurality of hosts. As described herein, a POD may refer to a basic unit of network segment made up of one or more switches (e.g., leaf switch, spine switch, and/or the like) and, in some cases, other network components (e.g., routers, cables, and/or the like), that together provide network services to the hosts. In some embodiments, the plurality of switches may include a plurality of electrical switches, such as leaf switches, spine switches, and/or the like. Each switch may be associated with a radix (k), which may refer to the number of ports on the switch. Said differently, the radix (k) may determine the connectivity capacity of the switch.

Given the radix (k) of a switch, the number of hosts that can be connected to each switch may be determined. In some example embodiments, if each host requires one port to connect to the switch, and assuming that each port of the switch is used to connect to a host (rather than inter-switch connections or uplinks), then each switch can support k/2 hosts. For example, if k=4, then each switch may support 2 hosts. As described herein, the hosts may be evenly and symmetrically distributed across the available PODs. As such, the total number of PODs may be determined based on the total number of hosts and the number of hosts that each POD can support. For example, if there are 16 hosts, and each POD can support 4 hosts, then there is a total of 4 PODs. As described herein, each POD may include one or more switches, depending on the architecture. In example embodiments where each POD has two leaf switches and two spine switches interconnecting the two leaf switches, as shown in FIG. 1, the hosts may be distributed in such a way that each leaf switch in a POD may have 2 hosts operatively coupled thereto.

As shown in block 306, the method may include operatively coupling the plurality of switches to the plurality of hosts to configure a network structure. In some embodiments, the network structure may be dynamically configured. In one aspect, dynamic configuration may refer to the ability of the network to reconfigure its structure and resource allocation in response to changing data distribution task requirements. The dynamic nature of this configuration allows for the tear-down and reconfiguration of the network's structure, aligning it with specific operational demands. For instance, depending on the task requirements, the network may switch from a topology optimized for high-volume data transfer to one focused on low-latency communication. In example embodiments, dynamic reconfiguration may involve altering the connections between leaf, spine, and/or core switches, as well as modifying the routing protocols and bandwidth allocation. For example, a network initially configured to support high-compute tasks may be reconfigured to prioritize storage or network-intensive workloads, based on the changing requirements of the hosts connected thereto.

As shown in block 308, the method may include identifying at least one destination host for each source host based on at least a number of communication hops required for traversal of data from each source host to the at least one destination host via a corresponding subset of the plurality of switches. As described herein, to execute an all-to-all communication pattern in the given network structure, the data communication process may be divided into stages, such that every host in the network may communicate with every other host. In specific embodiments, the number of data distribution stages may depend on an aggregate count of the number of hosts involved in the data distribution task. For instance, if the aggregate count of the hosts is 16, then the number of data distribution stages is 16. In instances in which the initial stage where the hosts transmit data to themselves is not implemented, the number of data distribution stages is 15. With 16 hosts and 4 PODs, each of the 4 PODs may have an equal distribution of hosts, with each POD facilitating connections to 4 distinct hosts. In this example, and with reference to FIG. 1, hosts H0, H1, H2, and H3 may connect to P1, while hosts H4, H5, H6, and H7 may connect to P2, and so forth.

Data communication at each stage is traditionally governed by j=(i+s) mod N. In this equation, i is the source host, j is the destination host, s is the stage, and N is the total number of hosts. In the example network described herein, the total number of hosts N is equal to 16. According to the given equation, at Stage 0, hosts primarily exchange data within themselves. For instance, H0 communicates with itself, as does H1 and subsequent hosts. Moving to Stage 1, each host forwards data to the next host in line: H0 to H1, H1 to H2, H2 to H3, and so on, continuing in this pattern. This stage brings forth inter-switch communication, such as when H1 under L1.1 transmits data to H2 under L1.2, H5 under L2.1 transmits data to H6 under L2.2, and so on. Stage 1 also bring forth inter-POD communications, such as H3 under L1.2 in P1 transmitting data to H4 under L2.1 in P2, H7 under L2.2 in P2 transmitting data to H8 under L3.1 in P3, and so on. Here, the number of communication hops required for inter-switch communication and the number of communication hops required for inter-POD communication are unequal as between the different source hosts. Communication hops may refer to a single step (e.g., switch) in the data transmission process between two hosts. For example, when H1 under L1.1 transmits data to H2 under L1.2, the number of communication hops is 3, as the data has to traverse from L1.1, S1.1, and then to L2.1 to reach H2. On the other hand, when H3 under L1.2 transmits data to H4 under L2.1, the number of communication hops is 5, as the data from H3 has to traverse through L1.2, S1.2, C0, S2.1, and L2.1 to reach H4. In Stage 2, every host transmits data to another two positions ahead: H0 to H2, H1 to H3, and so on. Similarly, in Stage 2, the number of communication hops required for inter-switch communication and the number of communication hops required for inter-POD communication are unequal. For example, when H1 under L1.1 transmits data to H3 under L1.2, the number of communication hops is 3, as the data has to traverse from L1.1, S1.1, and then to L2.1 to reach H3. On the other hand, when H2 under L1.2 transmits data to H4 under L2.1, the number of communication hops is 5, as the data from H2 has to traverse through L1.2, S1.2, C0, S2.1, and L2.1 to reach H5. As we progress through the stages, the distance between communicating hosts becomes greater, and the path that the data communication must travel through the network hierarchy becomes more convoluted, as the number of hops required for each communication increases.

To address the challenges posed by the permutation sequence described above, for each data distribution stage, embodiments of the method may identify a destination host (j) for each source host (i) based on a number of communication hops required for traversal of data from the source host (i) to the destination host (j) via corresponding switches. In particular, the destination host (j) may be identified based on $$j=\left(i+s \bmod \frac{k}{2}\right)+\left(\left(\frac{k}{2}*\left\lfloor\frac{i}{\frac{k}{2}}\right\rfloor+\frac{k}{2}*\left\lfloor\frac{s}{\frac{k}{2}}\right\rfloor\right) \bmod \frac{k^2}{4}\right)+\left(\left(\frac{k^2}{4}*\left\lfloor\frac{i}{\frac{k^2}{4}}\right\rfloor+\frac{k^2}{4}*\left\lfloor\frac{s}{\frac{k^2}{4}}\right\rfloor\right) \bmod \frac{k^3}{4}\right).$$

Here, k is the radix of the switches. To maintain equal number of communication hops between all host communications, at each stage, for every source host, i, the three parts of the equation are executed and subsequently aggregated to calculate the destination host j. The first part of the equation, $$\left(i+s \bmod \frac{k}{2}\right),$$

may define a cyclic sequence of communication between the plurality of hosts, ensuring that each host communicates with every other host. The second part of the equation, $$\left(\left(\frac{k}{2}*\left\lfloor\frac{i}{\frac{k}{2}}\right\rfloor+\frac{k}{2}*\left\lfloor\frac{s}{\frac{k}{2}}\right\rfloor\right) \bmod \frac{k^2}{4}\right),$$

may define a destination switch within a particular destination POD associated with the destination host. In other words, the second part of the equation may identify which switch within a given POD should be the destination for a particular communication process. In this regard, the second part of the equation may calculate a value that represents a switch offset, or relative position of the switch within a POD. Such a value may indicate which specific switch inside the POD should handle the data transmission for that communication instance. The third part of the equation, $$\left(\left(\frac{k^2}{4}*\left\lfloor\frac{i}{\frac{k^2}{4}}\right\rfloor+\frac{k^2}{4}*\left\lfloor\frac{s}{\frac{k^2}{4}}\right\rfloor\right) \bmod \frac{k^3}{4}\right),$$

may define a destination POD associated with the destination host. In this regard, the third part of the equation may calculate a value that represents a POD offset, or relative position of a destination host j within the hierarchy of PODs. Such a value may indicate which POD in the network's hierarchy should be the target for the communication. In other words, the third part of the equation may select the appropriate POD for the destination host for each communication stage. At each stage, for every source host, the three parts of the equation are executed and subsequently aggregated to determine the destination host. Such a structured approach assures that the number of hops from a source host to a destination host is consistent for all host interactions. In other words, at each stage, data communication from each source host to its corresponding destination host has equal number of communication hops. This is accomplished by methodically creating offsets at different layers of the network structure, ensuring balanced load and communication efficiency.

In various embodiments of the present invention, the disclosed equations are designed to encompass the upper limits Fat Tree network topologies. These embodiments specifically consider Fat Tree configurations with switches characterized by a radix, k, within each POD. The PODs in these embodiments are structured to include both leaf and spine layers. In such configurations, a single POD can accommodate up to $$\frac{k^2}{4}$$

hosts, with the total capacity of the network structure being capable of supporting a maximum of $$\frac{k^3}{4}$$

hosts. In instances where the network configuration does not fully utilize this maximum capacity, the proposed equations within this invention can be modified. Such modifications are intended to adapt the equations to suit the specific requirements of these non-maximum configurations, thereby ensuring the achievement of structured communication patterns that are equivalent in efficiency and organization to those observed in maximum configurations.

As shown in block 310, embodiments of the method may include executing the data distribution task by transmitting respective portions of the plurality of data portions from each source host to the at least one identified destination host via the corresponding subset of the plurality of switches. In some embodiments, the method may transmit the plurality of data portions in a sequence of data distribution stages based on the required number of data distribution stages. For each stage, upon identifying a destination host (j), the method may transmit the designated data portion from the source host (i) through an optimized path of switches, as determined by the equation described herein. In doing so, the method may optimize network performance by ensuring that at each stage, simultaneous data transmission from each source host to a corresponding destination host traverses an equal number of intermediary nodes (e.g., switches), or communication hops, regardless of their source and destination within the network.

In some embodiments, at each data distribution stage(s), each source host may transmit respective data portions to a corresponding destination host simultaneously. The number of destination hosts for each source host (i) may be determined based on a window size, W. For instance, for a window size W=1, at each stage a particular source host may communicate with exactly one destination host. However, there may be instances in which, during a stage, a source host may need to transmit data to two or more distinct destination hosts simultaneously. To manage these multiple destinations, for window size W>1, embodiments of the method may execute the data distribution task in a clustered grouping of data distribution stages, where the size of the clustered grouping is based on at least the window size, W. Here, the groups may be selected for clustering based on at least the number of communication hops required for traversal of data from each source host to the at least one identified destination host.

To execute the data distribution task in the sequence of data distribution stages, the method may iteratively determine the destination host (j) for each source host (i) at each data distribution stage(s) for the required number of data distribution stages. At each iteration, the method may transmit data portions from the plurality of data portions from the source host (i) to the determined destination host (j).

As described herein, the hosts may be evenly and symmetrically distributed across the available PODs. For instance, if there is a total of 4 PODs (e.g., P1, P2, P3, P4) as shown in FIG. 1, and a total of 16 hosts, each of the 4 PODs will have an equal number of distribution of hosts, with each POD facilitating connections to 4 distinct hosts. In some embodiments, the hosts may not be symmetrically distributed across the available PODs. In such cases, the method may integrate virtual hosts in the network structure to balance the asymmetric distribution hosts under each POD to create a symmetric distribution. In response, the method may execute the data distribution task as detailed herein. During transfer of data portions, if a virtual host is designated as a destination host, no actual data will be sent to the virtual host.

FIG. 3 thus illustrates flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, as described in connection with FIG. 2 above, the computer program instructions may be stored by a memory 114 of the system 102 and executed by a processor 112 of the system 102. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

FIG. 4 illustrates an example equation outcome table for optimized data communication associated with POD P1 of FIG. 1, in accordance with an embodiment of the invention. As shown in FIG. 4, the example equation outcome table 300 may be presented as a structured data representation comprising nine columns. Each of the first four columns 402 may represent a source host (i) (e.g., H0, H1, H2, or H3) in P1. The fifth column 404 may represent the stages(s) of iterative progression of the equation used to determine the destination host (j). The last four columns 406 may represent destination hosts (j) for corresponding source hosts (i) represented in the first four columns 402. For example, the sixth column may represent destination hosts for source host H0, the seventh column may represent destination hosts for source host H1, the eighth column may represent destination hosts for source host H2, and the ninth column may represent destination hosts for source host H3.

As described herein, for each data distribution stage(s), a destination host (j) may be identified for each source host (i) based on $$j = \left(i + s \bmod \frac{k}{2}\right) + \left(\left(\frac{k}{2} * \left\lfloor \frac{i}{\frac{k}{2}} \right\rfloor + \frac{k}{2} * \left\lfloor \frac{s}{\frac{k}{2}} \right\rfloor\right) \bmod \frac{k^2}{4}\right) + \left(\left(\frac{k^2}{4} * \left\lfloor \frac{i}{\frac{k^2}{4}} \right\rfloor + \frac{k^2}{4} * \left\lfloor \frac{s}{\frac{k^2}{4}} \right\rfloor\right) \bmod \frac{k^3}{4}\right).$$

For the example network structure described in FIG. 1, k=4. To execute an all-to-all communication pattern in the example network structure described in FIG. 1, every host in the network should communicate with every other host. Such communication may include both intra-POD communication and inter-POD communication. At each stage, each source host may transmit respective data portions to a corresponding destination host simultaneously. As shown in FIG. 4, in the first iteration, e.g., at Stage 0, according to embodiments of the invention, source host H0 transmits data portions to corresponding destination host H0, source host H1 transmits data portions to corresponding destination host H4, source host H2 transmits data portions to corresponding destination host H8, and source host H3 transmits data portions to corresponding destination host H12 simultaneously. In the second iteration, e.g., at Stage 1, source host H0 transmits data portions to corresponding destination host H1, source host H1 transmits data portions to corresponding destination host H0, source host H2 transmits data portions to corresponding destination host H3, and source host H3 transmits data portions to corresponding destination host H2 simultaneously. In the third iteration, e.g., at Stage 2, source host H0 transmits data portions to corresponding destination host H2, source host H1 transmits data portions to corresponding destination host H3, source host H2 transmits data portions to corresponding destination host H0, and source host H3 transmits data portions to corresponding destination host H1 simultaneously. As shown in FIG. 4, at each stage, the number of communication hops for data transmission between each source host and a destination host is equal, ensuring balanced load and communication efficiency. For example, at Stage 1, the number of communication hops for data transmission between each source host and a corresponding destination host is 0, as the source and destination host are operatively coupled to the same leaf switch. For each of Stages 2 and 3, the number of communication hops for data transmission between each source host and a corresponding destination host is 1. For each stage in Stages 4-7, the number of communication hops for data transmission between each source host and a corresponding destination host is 5. For each stage in Stages 8-11, the number of communication hops for data transmission between each source host and a corresponding destination host is 5. Lastly, for each stage in Stages 12-15, the number of communication hops for data transmission between each source host and a corresponding destination host is 5.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases the method may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 048833.000174 | To be assigned | SYSTEM FOR ALLOCATION OF NETWORK RESOURCES FOR OPTIMIZED DATA COMMUNICATION IN HIERARCHICAL NETWORKS | Concurrently herewith |

What is claimed is:

1. A method, the method comprising:

receiving, from a user input device, a data distribution task and parameters associated with the data distribution task, wherein the parameters comprise a plurality of data portions and a plurality of hosts;

determining a plurality of points of delivery (PODs) based on the plurality of hosts, wherein the plurality of PODs is associated with a plurality of switches, wherein each switch is associated with a radix (k);

operatively coupling the plurality of switches to the plurality of hosts to configure a network structure;

identifying, from the plurality of hosts, at least one destination host for each source host based on at least a number of communication hops, wherein the number of communication hops is determined based on a corresponding subset of the plurality of switches associated with traversal of data from each source host to the at least one destination host; and executing, in a sequence of data distribution stages, the data distribution task by transmitting respective portions of the plurality of data portions from each source host to the at least one identified destination host simultaneously via the corresponding subset of the plurality of switches, wherein, at each data distribution stage, the at least one destination host for each source host is identified based on at least a local offset derived from a cyclic rotation among hosts under each switch.

2. The method of claim 1, wherein executing the data distribution task comprises transmitting the plurality of data portions according to an all-to-all communication pattern.

3. The method of claim 1, wherein executing the data distribution task comprises:

determining a required number of data distribution stages for execution of the data distribution task based on at least an aggregate count of the plurality of hosts; and transmitting the plurality of data portions in a sequence of data distribution stages based on the required number of data distribution stages.

4. The method of claim 3, wherein, for each data distribution stage (s), the method comprises:

identifying the at least one destination host (j) for each source host (i) such that the number of communication hops required for traversal of data from each source host (i) to the at least one identified destination host (j) via the corresponding subset of the plurality of switches is equal; and transmitting a predetermined data portion from the source host (i) to the at least one identified destination host (j) via the corresponding subset of the plurality of switches.

5. The method of claim 4, wherein the at least one destination host is identified based on:

$$j = \left(i + s \bmod \frac{k}{2}\right) + \left(\left(\frac{k}{2} * \left\lfloor \frac{i}{\frac{k}{2}} \right\rfloor + \frac{k}{2} * \left\lfloor \frac{s}{\frac{k}{2}} \right\rfloor\right) \bmod \frac{k^2}{4}\right) + \left(\left(\frac{k^2}{4} * \left\lfloor \frac{i}{\frac{k^2}{4}} \right\rfloor + \frac{k^2}{4} * \left\lfloor \frac{s}{\frac{k^2}{4}} \right\rfloor\right) \bmod \frac{k^3}{4}\right)$$

6. The method of claim 4, wherein $$\left(i + s \bmod \frac{k}{2}\right)$$

defines a cyclic sequence of communication between the plurality of hosts under each switch.

7. The method of claim 4, wherein $$\left(\left(\frac{k}{2} * \left\lfloor \frac{i}{\frac{k}{2}} \right\rfloor + \frac{k}{2} * \left\lfloor \frac{s}{\frac{k}{2}} \right\rfloor\right) \bmod \frac{k^2}{4}\right)$$

identifies a destination switch within a destination POD associated with the at least one identified destination host (j) by determining a switch offset defining a relative position of the destination switch within the destination POD.

8. The method of claim 7, wherein $$\left(\left(\frac{k^2}{4} * \left\lfloor \frac{i}{\frac{k^2}{4}} \right\rfloor + \frac{k^2}{4} * \left\lfloor \frac{s}{\frac{k^2}{4}} \right\rfloor\right) \bmod \frac{k^3}{4}\right)$$

identifies a destination POD associated with the at least one identified destination host (j) by determining a POD offset defining a relative position of the at least one identified destination host (j) within the plurality of PODs.

9. The method of claim 3, wherein, for each data distribution stage(s), a number of destination hosts for each source host (i) is determined based on a window size W.

10. The method of claim 9, wherein the number of destination hosts for each source host (i) is equal to the window size W.

11. The method of claim 9, wherein for window size W>1, executing the data distribution task comprises executing the data distribution task in a clustered grouping of data distribution stages, wherein a size of the clustered grouping is based on at least the number of communication hops required for traversal of data from each source host to the at least one identified destination host via the corresponding subset of the plurality of switches.

12. The method of claim 3, wherein executing the data distribution task in the sequence of data distribution stages further comprises:

iteratively determining the at least one identified destination host (j) for each source host (i) at each data distribution stage(s) for the required number of data distribution stages; and at each iteration, transmitting data portions from the plurality of data portions from the source host (i) to the at least one identified destination host (j).

13. The method of claim 1, wherein the method comprises:

determining that an allocation of the subset of the plurality of hosts under each POD is asymmetric;

integrating a plurality of virtual hosts in the network structure to balance an asymmetric distribution of the subset of the plurality of hosts under each POD; and executing the data distribution task by transmitting respective portions of the plurality of data portions from each source host to the at least one identified destination host via the corresponding subset of the plurality of PODs, wherein the at least one identified destination host comprises at least one of the plurality of hosts and the plurality of virtual hosts.

14. The method of claim 13, wherein transmitting further comprises transmitting no data to the plurality of virtual hosts.

15. The method of claim 4, wherein the at least one destination host for each source host is identified based on at least one of, (i) a local offset derived from a cyclic rotation among hosts under each switch, (ii) a switch offset that determines a destination switch within a corresponding destination POD, or (iii) a POD offset that determines the destination POD within a hierarchical network.

16. The method of claim 15, wherein the local offset is computed by rotating a source host index forward by an amount determined by the data distribution stage such that each host communicates in turn with all other hosts connected to the same switch.

17. The method of claim 15, wherein the switch offset is determined by partitioning the plurality of hosts into groups based on a number of hosts connected to each switch, and determining the destination switch for each source host and data distribution stage based on an index shift between source group and stage group, wherein the switch offset remains bounded within a number of switches in each destination POD.

18. The method of claim 15, wherein the POD offset is determined by partitioning the plurality of hosts into POD-level groups, and determining the destination POD for each source host and data distribution stage based on an index shift between a source POD group and a group index derived from the data distribution stage using the same POD-level partitioning logic, wherein the POD offset remains bounded within a number of PODs in the hierarchical network.

19. A system, the system comprising:

a processing device; and a non-transitory storage device containing instructions that, when executed by the processing device, cause the processing device to:

receive, from a user input device, a data distribution task and parameters associated with the data distribution task, wherein the parameters comprise a plurality of data portions and a plurality of hosts;

determine a plurality of points of delivery (PODs) based on the plurality of hosts, wherein the plurality of PODs is associated with a plurality of switches, wherein each switch is associated with a radix (k);

operatively couple the plurality of switches to the plurality of hosts to configure a network structure;

identify, from the plurality of hosts, at least one destination host for each source host based on at least a number of communication hops, wherein the number of communication hops is determined based on a corresponding subset of the plurality of switches associated with traversal of data from each source host to the at least one destination host; and execute, in a sequence of data distribution stages, the data distribution task by transmitting respective portions of the plurality of data portions from each source host to the at least one identified destination host simultaneously via the corresponding subset of the plurality of switches, wherein, at each data distribution stage, the at least one destination host for each source host is identified based on at least a local offset derived from a cyclic rotation among hosts under each switch.

20. The system of claim 19, wherein the instructions, when executed, cause the processing device to execute the data distribution task by transmitting the plurality of data portions according to an all-to-all communication pattern.

21. The system of claim 19, wherein the instructions, when executed, cause the processing device to execute the data distribution task by:

determining a required number of data distribution stages for execution of the data distribution task based on at least an aggregate count of the plurality of hosts; and transmitting the plurality of data portions in a sequence of data distribution stages based on the required number of data distribution stages.

22. The system of claim 21, wherein for each data distribution stage (s), the instructions, when executed, cause the processing device to:

identify the at least one destination host (j) for each source host (i) such that the number of communication hops required for traversal of data from each source host (i) to the at least one identified destination host (j) via the corresponding subset of the plurality of switches is equal; and transmit a predetermined data portion from the source host (i) to the at least one identified destination host (j) via the corresponding subset of the plurality of switches.

23. The system of claim 22, wherein the instructions, when executed, cause the processing device to identify the at least one destination host based on at least one of, (i) a local offset derived from a cyclic rotation among hosts under each switch, (ii) a switch offset that determines a destination switch within a corresponding destination POD, or (iii) a POD offset that determines the destination POD within a hierarchical network.

24. The system of claim 23, wherein, in determining the local offset, the instructions, when executed, cause the processing device to rotate a source host index forward by an amount determined by the data distribution stage such that each host communicates in turn with all other hosts connected to the same switch.

25. The system of claim 23, wherein, in determining the switch offset, the instructions, when executed, cause the processing device to partition the plurality of hosts into groups based on a number of hosts connected to each switch, and determine the destination switch for each source host and data distribution stage based on an index shift between source group and stage group, wherein the switch offset remains bounded within a number of switches in each destination POD.

26. The system of claim 23, wherein, in determining the POD offset, the instructions, when executed, cause the processing device to partition the plurality of hosts into POD-level groups, and determine the destination POD for each source host and data distribution stage based on an index shift between a source POD group and a group index derived from the data distribution stage using the same POD-level partitioning logic, wherein the POD offset remains bounded within a number of PODs in the hierarchical network.

27. A computer program product, the computer program product comprising a non-transitory computer-readable medium comprising code configured to cause an apparatus to:

receive, from a user input device, a data distribution task and parameters associated with the data distribution task, wherein the parameters comprise a plurality of data portions and a plurality of hosts;

determine a plurality of points of delivery (PODs) based on the plurality of hosts, wherein the plurality of PODs is associated with a plurality of switches, wherein each switch is associated with a radix (k);

operatively couple the plurality of switches to the plurality of hosts to configure a network structure;

identify, from the plurality of hosts, at least one destination host for each source host based on at least a number of communication hops, wherein the number of communication hops is determined based on a corresponding subset of the plurality of switches associated with traversal of data from each source host to the at least one destination host; and execute, in a sequence of data distribution stages, the data distribution task by transmitting respective portions of the plurality of data portions from each source host to the at least one identified destination host simultaneously via the corresponding subset of the plurality of switches, wherein, at each data distribution stage, the at least one destination host for each source host is identified based on at least a local offset derived from a cyclic rotation among hosts under each switch.

* * * * *